(12) United States Patent
Gupte et al.

(10) Patent No.: US 10,225,546 B2
(45) Date of Patent: Mar. 5, 2019

(54) INDEPENDENT MULTI-RESOLUTION CODING

(71) Applicant: QUALCOMM Incorporated, San Diego, CA (US)

(72) Inventors: Ajit Gupte, Bangalore (IN); Ajit Rao, Bangalore (IN); Mina Ayman Saleh Yanni Makar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 228 days.

(21) Appl. No.: 15/195,439

(22) Filed: Jun. 28, 2016

(65) Prior Publication Data
US 2017/0251204 A1    Aug. 31, 2017

(30) Foreign Application Priority Data

Feb. 26, 2016 (IN) .............................. 201641006779

(51) Int. Cl.
| | | |
|---|---|---|
| *H04N 13/00* | (2018.01) | |
| *H04N 13/315* | (2018.01) | |
| *H04N 13/178* | (2018.01) | |
| *H04N 13/398* | (2018.01) | |
| *H04N 19/597* | (2014.01) | |
| *H04N 19/46* | (2014.01) | |
| *H04N 19/146* | (2014.01) | |

(Continued)

(52) U.S. Cl.
CPC ......... *H04N 13/315* (2018.05); *H04N 13/178* (2018.05); *H04N 13/398* (2018.05); *H04N 19/146* (2014.11); *H04N 19/154* (2014.11); *H04N 19/167* (2014.11); *H04N 19/33* (2014.11); *H04N 19/46* (2014.11); *H04N 19/59* (2014.11); *H04N 19/597* (2014.11)

(58) Field of Classification Search
CPC ... H04N 13/315; H04N 13/178; H04N 13/398
See application file for complete search history.

(56) References Cited

U.S. PATENT DOCUMENTS 9,215,466 B2 * 12/2015 Zhai ...................... H04N 19/61
2006/0034367 A1    2/2006 Park
(Continued)

OTHER PUBLICATIONS

Response to Written Opinion filed in International Application No. PCT/US2016/067874 filed Dec. 20, 2017, 7 pp.
(Continued)

*Primary Examiner* — Jonathan R Messmore
(74) *Attorney, Agent, or Firm* — Shumaker & Sieffert, P.A.

(57) ABSTRACT

In one example, a device for retrieving video data includes a display interface coupled to a display, a memory configured to store video data, and one or more processors configured to determine a plurality of regions of video data to be displayed via the display, retrieve video data having a first quality for a first subset of the plurality of regions at which a visual focus of a user is directed, retrieve video data having a second quality for a second subset of the plurality of regions that neighbor the first subset of the plurality of regions, wherein the second quality is lower than the first quality, and retrieve video data having a third quality for a third subset of the plurality of regions that is outside the first subset and the second subset, wherein the third quality is lower than the second quality.

30 Claims, 11 Drawing Sheets

(51) Int. Cl.
H04N 19/154 (2014.01)
H04N 19/167 (2014.01)
H04N 19/33 (2014.01)
H04N 19/59 (2014.01)

(56) References Cited

U.S. PATENT DOCUMENTS

| | | | | |
|---|---|---|---|---|
| 2011/0194125 | A1* | 8/2011 | Rivshin | G06K 15/1849 |
| | | | | 358/1.9 |
| 2012/0050616 | A1* | 3/2012 | Andersson | H04N 21/2662 |
| | | | | 348/564 |
| 2012/0146891 | A1* | 6/2012 | Kalinli | H04N 19/33 |
| | | | | 345/156 |
| 2014/0087867 | A1* | 3/2014 | Hightower | G02B 27/017 |
| | | | | 463/31 |
| 2014/0369618 | A1* | 12/2014 | Asaka | H04N 19/115 |
| | | | | 382/243 |
| 2015/0023430 | A1 | 1/2015 | Choi et al. | |
| 2016/0182941 | A1* | 6/2016 | Crabtree | H04N 21/23106 |
| | | | | 725/115 |
| 2016/0234282 | A1* | 8/2016 | Lederer | H04L 65/608 |

OTHER PUBLICATIONS

Alface P.R., et al., "Evaluation of Bandwidth Performance for Interactive Spherical Video", Multimedia and Expo (ICME), 2011 IEEE International Conference on, IEEE, Jul. 11, 2011 (Jul. 11, 2011), XP031964916, pp. 1-6.
Choi B., et al., "Proposed Text for Omnidirectional Media Application Format", 114. MPEG Meeting; Feb. 22, 2016-Feb. 26, 2016; San Diego; (Motion Picture Expert Group or ISO/IEC JTC1/SC29/WG11), No. m37837, Feb. 28, 2016 (Feb. 20, 2016), XP030066203, 13 Pages.
Emori T., et al., "[FTV AHG] Study on Free Viewpoint Video Streaming Using Mixed Resolution Multi-View Video and Low Resolution Depth Maps", 110. MPEG Meeting, Oct. 20, 2014-Oct. 24, 2014, Strasbourg, (Motion Picture Expert Group or ISO/IEC JTC1/SC29/WG11), No. m35213, Oct. 19, 2014 (Oct. 19, 2014), XP030063585, 14 pages.
International Search Report and Written Opinion—PCT/US2016/067874—ISA/EPO—dated May 30, 2017—29 pp.
Niamut: "Advanced Audiovisual Rendering, Gesture-Based Interaction and Distributed Delivery for Immersiveand Interactive Media Services" , International Broadcasting Conference 2012; Sep. 12, 2012-Sep. 17, 2012; Amsterdam, Sep. 12, 2012 (Sep. 12, 2012), XP030082430, 10 Pages.
Partial International Search Report and Written Opinion—PCT/US2016/067874—ISA/EPO—dated Mar. 2, 2017—8 pp.
Quackenbush S: "Audio Contribution to Omnidirectional Media Application Format", 116. MPEG Meeting; Oct. 17, 2016-Oct. 21, 2016; Chengdu; (Motion Picture Expert Group or ISO/IEC JTC1/SC29/WG11), No. m39276, Oct. 12, 2016 (Oct. 12, 2016), XP030067622, 42 Pages.
Shimizu S., et al., "Use Cases and Requirements on Free-Viewpoint Television (FTV) v.2", 113. MPEG Meeting, Oct. 19, 2015-Oct. 23, 2015, Geneva, (Motion Picture Expert Group or ISO/IEC JTC1/SC29/WG11), No. N15732, Nov. 9, 2015 (Nov. 9, 2015), XP030022415, 14 pages.
Sinha S.N., et al., "Pan-tilt-Zoom Camera Calibration and High-Resolution Mosaic Generation", Computer Vision and Image Understanding, Academic Press, US, vol. 103, No. 3, Sep. 1, 2006, XP024917677, 14 pp.

Van Der Auwera G., et al., "AHG8: Truncated Square Pyramid Projection (TSP) for 360 Video", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0071, Oct. 6, 2016 (Oct. 6, 2016), XP030150304, 9 Pages.
Van Der Auwera G et al: "OMAF: TSP for VR/360 Video", 116. MPEG Meeting; Oct. 17, 2016-Oct. 21, 2016; Chengdu; (Motion Picture Expert Group or ISO/IEC JTC1/SC29/WG11), No. m39305, Oct. 12, 2016 (Dec. 18, 2016), XP030067651, 11 Pages.
Wang Y-K., et al., "Tile Based VR video Encoding and Decoding Schemes", 24. JCT-VC Meeting, May 26, 2016-Jun. 1, 2016, Geneva, (Joint Collaborative Team on Video Coding of ISO/IEC JTC1/SC29/WG11 and ITU-T 5G.16 ), No. JCTVC-X0077, May 25, 2016 (May 25, 2016), XP030118015, 6 pages. URL: http://wftp3.itu.int/av-arch/jctvc-site/.
Wang Y-K., et al., "Viewport Dependent Processing in VR: Partial Video Decoding," 5. MPEG Meeting, May 30, 2016-Jun. 3, 2016, Geneva, (Motion Picture Expert Group or ISO/IEC JTC1/5C29/WG11), No. m38559, May 25, 2016 (May 25, 2016), XP030066915, 7 pages.
Watanabe S., et al., "DASH: Concepts and Descriptions Proposal on Spatial Relationship Description (CE SRD)", 106. MPEG Meeting, Oct. 28, 2013-Nov. 1, 2013, Geneva, (Motion Picture Expert Group or ISO/IEC JTC1/SC29/WG11),, No. m31309, Oct. 23, 2013 (Oct. 23, 2013), XP030059762, 4 pages.
Yamazawa (Naist) K., et al., "Plan of JEITA for Omni-Directional Video", 66. MPEG Meeting; Brisbane; (Motion Picture Expert Group or ISO/IEC JTC1/SC29/WG11), No. M10095, Jul. 2003, XP030030973, 3 Pages.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.263, "Series H: Audiovisual and Multimedia Systems, Infrastructure of audiovisual services—Coding of moving video, Video coding for low bit rate communication," The International Telecommunication Union. Jan. 2005, 226 pp.
ITU-T H.264, "Series H: Audiovisual and Multimedia Systems, Infrastructure of audiovisual services—Coding of moving video, Advanced video coding for generic audiovisual services," The International Telecommunication Union. Jun. 2011, 674 pp.
ITU-T H.223, "Series H: Audiovisual and Multimedia Systems, Infrastructure of audiovisual services—Transmission multiplexing and synchronization, Multiplexing protocol for low bit rate multimedia communication," The International Telecommunication Union, Jul. 2001, 74 pp.
Mavlankar et al., "Optimal Slice Size for Streaming Regions of High Resolution Video with Virtual Pan/Tilt/Zoom Functionality," European Signal Processing Conference, Poznan, Poland, Sep. 3-7, 2007, 5 pp.
Mavlankar et al., "Spatial-Random-Access-Enabled Video Coding for Interactive Virtual Pan/Tilt/Zoom Functionality," IEEE Transactions on Circuits and Systems for Video Technology, vol. 21, No. 5, May 2011, 12 pp.
Invitation to Pay Additional Fees in International Application No. PCT/US2016/067874 dated Jan. 30, 2018, 7 pp.
Written Opinion issued in International Application No. PCT/US2016/067874 dated Mar. 20, 2018, 12 pp.
International Preliminary Report on Patentability issued in International Application No. PCT/US2016/067874 dated Jun. 19, 2018, 13 pp.

* cited by examiner

INDEPENDENT MULTI-RESOLUTION CODING

This application claims priority to India Patent Application No. 201641006779, filed Feb. 26, 2016, the entire content of which is hereby incorporated by reference.

TECHNICAL FIELD

This disclosure relates to transfer of media data, such as video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

In general, the techniques of this disclosure are directed to retrieving video data of various qualities for different regions of a canvas (or display), based on a user's field of vision or focus. For example, video data of a high quality (e.g., spatial resolution or pixel density) may be retrieved for a first subset of regions within the user's field of vision, video data of a lower quality may be retrieved for a second subset of regions neighboring the first subset of regions, and video data of an even lower quality may be retrieved for a third subset of regions neighboring the second subset of regions. In this manner, if the user's field of vision (or visual focus) changes, a degree of reduction in perceived quality can be reduced. That is, between the time the user's visual focus changes and high quality video data can be retrieved, the currently displayed video data will not necessarily be a lowest available quality, assuming the user's visual focus has shifted to the second subset of regions. The available qualities may correspond to at least one of spatial resolution, quantization parameters (QPs), peak signal to noise ratio (PSNR), or bitrate, in some examples.

In one example, a method of retrieving video data includes determining a plurality of regions of video data to be displayed via a display, retrieving video data having a first quality for a first subset of the plurality of regions at which a visual focus of a user is directed, retrieving video data having a second quality for a second subset of the plurality of regions that neighbor the first subset of the plurality of regions, wherein the second quality is lower than the first quality, and retrieving video data having a third quality for a third subset of the plurality of regions that is outside the first subset and the second subset, wherein the third quality is lower than the second quality.

In another example, a device for retrieving video data includes a display interface coupled to a display, a memory configured to store video data, and one or more processors configured to determine a plurality of regions of video data to be displayed via the display, retrieve video data having a first quality for a first subset of the plurality of regions at which a visual focus of a user is directed, retrieve video data having a second quality for a second subset of the plurality of regions that neighbor the first subset of the plurality of regions, wherein the second quality is lower than the first quality, and retrieve video data having a third quality for a third subset of the plurality of regions that is outside the first subset and the second subset, wherein the third quality is lower than the second quality.

In another example, a device for retrieving video data includes means for determining a plurality of regions of video data to be displayed via a display, means for retrieving video data having a first quality for a first subset of the plurality of regions at which a visual focus of a user is directed, means for retrieving video data having a second quality for a second subset of the plurality of regions that neighbor the first subset of the plurality of regions, wherein the second quality is lower than the first quality, and means for retrieving video data having a third quality for a third subset of the plurality of regions that is outside the first subset and the second subset, wherein the third quality is lower than the second quality.

In another example, a computer-readable storage medium is encoded with instructions that, when executed, cause a processor to determine a plurality of regions of video data to be displayed via a display, retrieve video data having a first quality for a first subset of the plurality of regions at which a visual focus of a user is directed, retrieve video data having a second quality for a second subset of the plurality of regions that neighbor the first subset of the plurality of regions, wherein the second quality is lower than the first quality, and retrieve video data having a third quality for a third subset of the plurality of regions that is outside the first subset and the second subset, wherein the third quality is lower than the second quality.

The details of one or more examples are set forth in the accompanying drawings and the description below. Other features, objects, and advantages will be apparent from the description and drawings, and from the claims.

DETAILED DESCRIPTION

Figure 1:
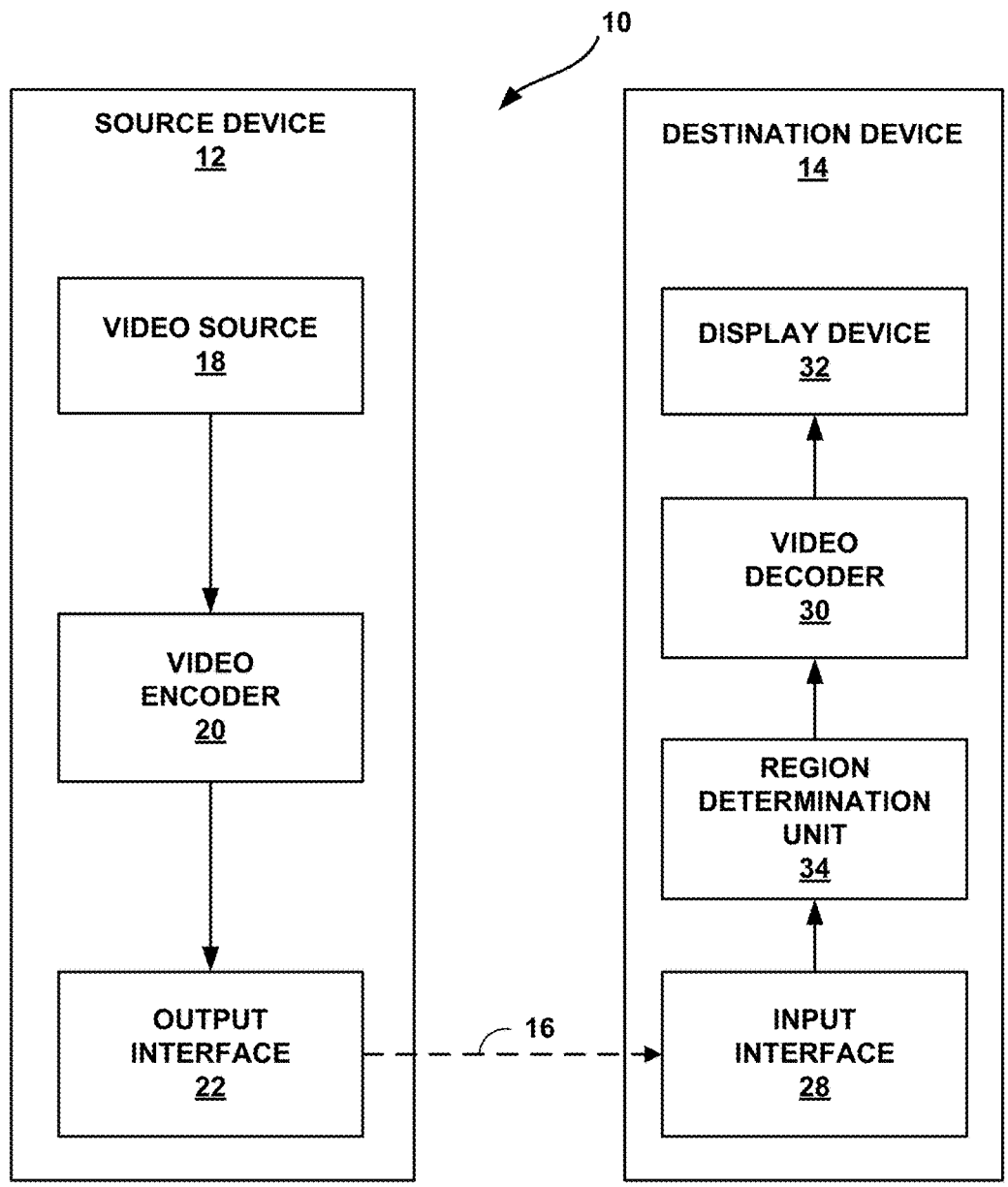
FIG. 1 is a block diagram illustrating an example video encoding and decoding system that may utilize techniques for transferring multi-resolution media data.

The techniques of this disclosure generally relate to transmission (e.g., sending and/or receiving) of media data (such as video data) coded at various levels of quality for different regions at which the media data is to be played back. For example, the techniques of this disclosure may be used by a client device that includes a panoramic display, such as a display that partially or fully envelopes a viewer. In general, the display is configured such that a visual focus of a user is directed to only a portion of the display at a given time.

In accordance with the techniques of this disclosure, a client device including or communicatively coupled to such a display may retrieve higher quality media data (such as media data having a larger spatial resolution) for regions of the display at which the user is directing focus, slightly lower quality media data for regions of the display that spatially neighbor the regions at which the user is directing focus, and even lower quality media data for other regions of the display. The client device may buffer the retrieved video data for subsequent decoding and playback.

The techniques of this disclosure may reduce decoder complexity. Today, many smartphones include decoders capable of decoding 4k (e.g., 3840×2160 pixels) video data at 30 frames per second. Some smartphones even include decoders capable of decoding 4k video data at 60 frames per second. Good quality panoramic video data requires a much larger canvas (that is, full display area), however. For example, a 6k (e.g., 6144×3072 pixels) canvas has been shown to provide significant visual quality gains compared to a 4k canvas for panoramic playback. With better optics in head mounted displays (HMDs) and better content, visual quality may be significantly improved with higher resolution. This is because the human eye can resolve up to $\frac{1}{60}^{th}$ of a degree at the center of the field of vision.

This disclosure describes partial decoding techniques, which may improve the user's experience. In particular, according to these techniques, a decoder of a client device may decode the content that the user is observing (that is, the content at which the visual focus of the user is directed) at a desired resolution, and other content may be decoded at lower resolution(s). In this manner, these techniques may reduce data bandwidth. Such may be beneficial, because the average Internet connection bandwidth today in the U.S. is around 5 mbps, whereas the bandwidth needed to receive 4k video at 30 frames per second is approximately 20-30 mbps.

In a typical partial decode scheme, panoramic video is coded in the form of two spatial layers. A base layer is coded using inter- and intra-prediction. The base layer is sent and decoded for an entire canvas (e.g., an entire spherical display). An enhancement layer may be predicted using both inter- and intra-prediction. The enhancement layer may be sent and decoded only as much as needed, based on the user's current head position. In such a setup, if the user has a sudden head movement, the low resolution base layer video will be displayed until the enhancement layer video for the new view can be displayed. The latency to display the enhancement layer video can be kept small with low delay temporal prediction schemes (such as small intervals between I-frames, or even all intra-coding), but at a trade-off between latency and compression efficiency. When higher resolution content is streamed based on direction of viewing, the latency to display the higher resolution may be relatively high.

Furthermore, in typical partial decode schemes, interlayer prediction may or may not be used. Scalable coding with inter-layer prediction may or may not be supported by certain decoding devices. If inter-layer prediction is used and the enhancement layer does not use temporal prediction, latency for viewing the high resolution video can be avoided. Again, there is a trade-off between latency and compression efficiency. The bit rate increase can be very high in the absence of temporal prediction.

Typically, the enhancement layer panorama is divided into multiple tiles (or regions) that are coded spatially and temporally independently of each other. A video encoder may enforce additional constraints to disallow inter-tile temporal prediction. A typical field of view (FOV) is ~90×90 degrees. In a point-to-point connection, enhancement layer data may be accessed on demand.

Typical partial decoding schemes may encounter certain limitations. For example, when a user turns his/her head to view content in another direction, lower quality content is displayed for some amount of time. That is, the lower quality content is retrieved, buffered, decoded, and presented, in case the user turns his or her head toward the corresponding area of the canvas. In conventional schemes, the quality drop is drastic. For example, 6k resolution video data may drop to 1080p resolution, which is a quality reduction on the order of nine times. The delay in displaying higher quality content can be quite large, as well, e.g., a few seconds in a streaming scenario.

The techniques of this disclosure may be used to improve panoramic display relative to the conventional schemes described above. For example, this disclosure describes an independent multi-resolution coding scheme. This scheme allows a gradual quality drop-off from positions that are away from a user's current viewpoint (that is, a point at which the visual focus of the user is directed). This may achieve a better tradeoff between bitrate and user experience. Likewise, this may allow similar decoder performance gains as traditional partial decode approaches, while improving the user experience. For example, these techniques may allow decoding and presentation of a 6k resolution mono video at 30 frames per second (18 megapixels (MP) per frame) panorama viewing on a 4k resolution video at 30 frames per second (8 MP per frame) decode-capable device. These techniques may also allow 4k resolution at 30 frames per second stereo panorama viewing on a 4k resolution at 30 frames per second mono video at 30 frames per second decode-capable device. Furthermore, these techniques may also allow 6k resolution video data at 30 frames per second stereo panorama viewing on a 6k resolution mono video data at 30 frames per second decode-capable device.

This disclosure also describes techniques related to a multiple storage scheme based on tile (or region) combining, where loss in coding efficiency may be avoided by combining smaller tiles into larger tiles at the encoder. This may result in increased storage redundancy, but improve overall user experience and coding efficiency when the visual focus of the user is directed at a position of the display that can be represented using the larger tiles.

Furthermore, this disclosure describes techniques that may reduce latency for stereo video data. In particular, when stereo video data is to be displayed (e.g., to produce a three-dimensional (3D) effect), I-frames in the stereo views may be offset relative to each other. For example, I-frames in a left-eye view may occur at the start of a group of pictures (GOP) period. In a corresponding right-eye view, I-frames may occur half-way between the I-frames of the left-eye view. In this manner, when switching between quality levels (e.g., spatial resolutions) for a region, the view having the next closest I-frame may be switched before the other view. In this manner, for a brief period of time, one of the views may have a higher quality than the other. This may improve user experience by reducing latency to receive the higher quality video data.

FIG. 1 is a block diagram illustrating an example video encoding and decoding system 10 that may utilize techniques for transferring multi-resolution (or generally, multi-quality) media data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, display device 32, and region determination unit 34. In accordance with this disclosure, video encoder 20 of source device 12 may be configured to apply certain aspects of the techniques for transferring multi-resolution media data. Region determination unit 34 and video decoder 30 of destination device 14 may also be configured to perform various aspects of the techniques of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for transferring multi-resolution media data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, e.g., including one or more processors, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Hence, an encoder or decoder may be formed by any of a variety of integrated processing circuitry comprising one or more processors implemented as fixed hardware processing circuitry, programmable processing circuitry and/or a combination of both fixed and programmable processing circuitry. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

In accordance with the techniques of this disclosure, output interface 22 and input interface 28 may correspond to network interfaces, such as network interface cards (NICs) implementing one or more network protocols, such as Ethernet. Computer-readable medium 16 may correspond to a network connection, which may traverse a private or public network, such as the Internet.

Figure 2A:
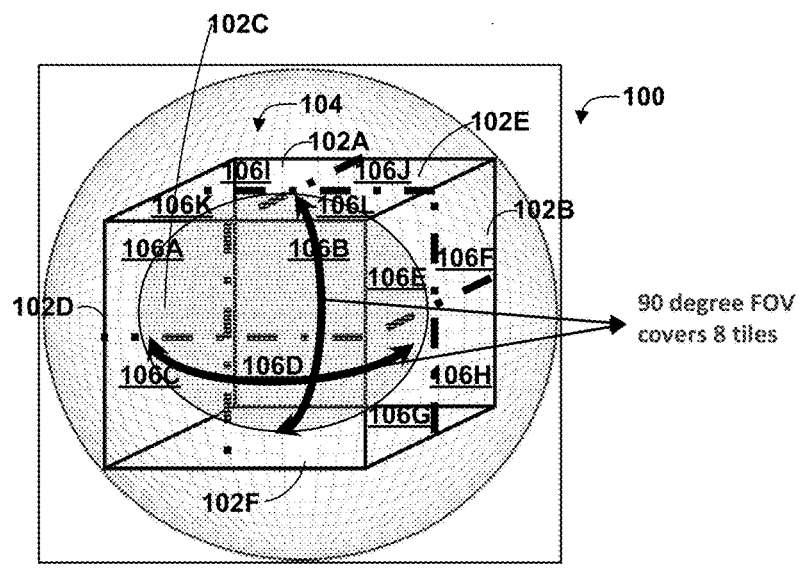
FIGS. 2A and 2B are conceptual diagrams illustrating representations of models for displays used to present panoramic video data.

Display device 32 may correspond to a panoramic display. For example, display device 32 may correspond to a head-mounted display (HMD) or one or more screens that substantially or fully envelop a user. Region determination unit 34 may be configured to determine a plurality of regions of display device 32. For example, as shown in FIG. 2A, discussed in greater detail below, display device 32 may include a plurality of tiles, e.g., one or more portions of cube faces corresponding to a spherical display (or display that can simulate a spherical display, such as an HMD).

As discussed herein, region determination unit 34 may determine one or more of the regions at which a visual focus of the user (not shown in FIG. 1) is directed. In accordance with the techniques of this disclosure, region determination unit 34 may cause input interface 28 to retrieve video data having a first quality (e.g., spatial resolution) for a first subset of regions of display device 32 at which a visual focus of a user is directed, retrieve video data having a second quality for a second subset of the plurality of regions that neighbor the first subset of the plurality of regions, where the second quality is lower than the first quality, and retrieve video data having a third quality for a third subset of the plurality of regions that is outside the first subset and the second subset, where the third quality is lower than the second quality.

In some examples, video data for each of the regions may be retrieved and buffered for a period of time. The size of the buffer may depend on, e.g., network bandwidth fluctuations. For example, if the available network bandwidth is experiencing large fluctuations, the buffer size may be increased, whereas if available network bandwidth is relatively stable, the buffer size may be reduced. In this manner, the size of the buffer may be inversely proportional to the amount of bandwidth fluctuation. In general, it may be desirable to keep the buffer size as small as possible, but as large as needed to satisfy the bandwidth fluctuations. Moreover, in some examples, different buffer sizes may be used for different qualities of video data. For example, a relatively large buffer may be used for thumbnail video (that is, low quality video that covers the entire canvas), and smaller buffers may be used for other regions of the canvas (e.g., a current user field of view).

Source device 12 and destination device 14 may be configured to transfer video data according to the techniques of this disclosure. For example, video encoder 20 and video decoder 30 may implement the independent multi-resolution coding (IMRC) techniques of this disclosure. IMRC is a new approach to partial decoding techniques. In accordance with IMRC, independently coded multiple resolution streams may be transferred, as compared to the scalable coding approach used in traditional partial decode schemes. IMRC may allow for gradual quality drop off over a range of regions or tiles positioned progressively further away from the user's current viewpoint.

In particular, video encoder 20 may encode data for the full panorama at multiple resolutions, e.g., 6k, 4k, HD (1080p), and 720p. That is, video encoder 20 may encode video data for each region (or "tile") at each of these multiple resolutions. In this manner, tile granularity may be the same for each resolution. Video encoder 20 may avoid inter-layer dependency when encoding the various resolutions. Thus, video decoder 30 may decode video data for the tiles at different resolutions in a selective manner (e.g., as selected by region determination unit 34). For example, region determination unit 34 may select a highest available resolution for regions at a center of the user's current viewpoint. Moving away from the center of the current viewpoint, the decoded resolution may drop gradually. That is, region determination unit 34 may select resolutions that get proportionally lower for regions (tiles) that are further from the center of the current viewpoint. Thus, video decoder 30 may decode video data at the lowest available resolution for tiles behind the user's current viewpoint.

Video encoder 20, video decoder 30, and region determination unit 34 each may be implemented as any of a variety of suitable fixed and/or programmable circuitry, as applicable, such as one or more microprocessors, digital signal processors (DSPs), application specific integrated circuits (ASICs), field programmable gate arrays (FPGAs), discrete logic circuitry, software, hardware, firmware, or any combinations thereof. When functionality is implemented in software or firmware, instructions for the software or firmware are generally stored in a hardware-based computer-readable storage medium and executed by one or more processors, which again are implemented using logic circuitry. Each of video encoder 20 and video decoder 30 may be included in one or more encoders or decoders, either of which may be integrated as part of a combined video encoder/decoder (CODEC). A device including video encoder 20, video decoder 30, and/or region determination unit 34 may comprise an integrated circuit, a microprocessor, and/or a wireless communication device, such as a cellular telephone.

Destination device 14 may include a memory configured to store retrieved video data, such as a hard disk and/or a buffer. Such memory may be included within video decoder 30, region determination unit 34, or elsewhere within destination device 34.

In this manner, destination device 14 (and region determination unit 34) represent examples of a device including a display interface coupled to a display, a memory configured to store video data, and one or more processors configured to determine a plurality of regions of video data to be displayed via the display, retrieve video data having a first quality for a first subset of the plurality of regions at which a visual focus of a user is directed, retrieve video data having a second quality for a second subset of the plurality of regions that neighbor the first subset of the plurality of regions, wherein the second quality is lower than the first quality, and retrieve video data having a third quality for a third subset of the plurality of regions that is outside the first subset and the second subset, wherein the third quality is lower than the second quality.

Figure 2B:
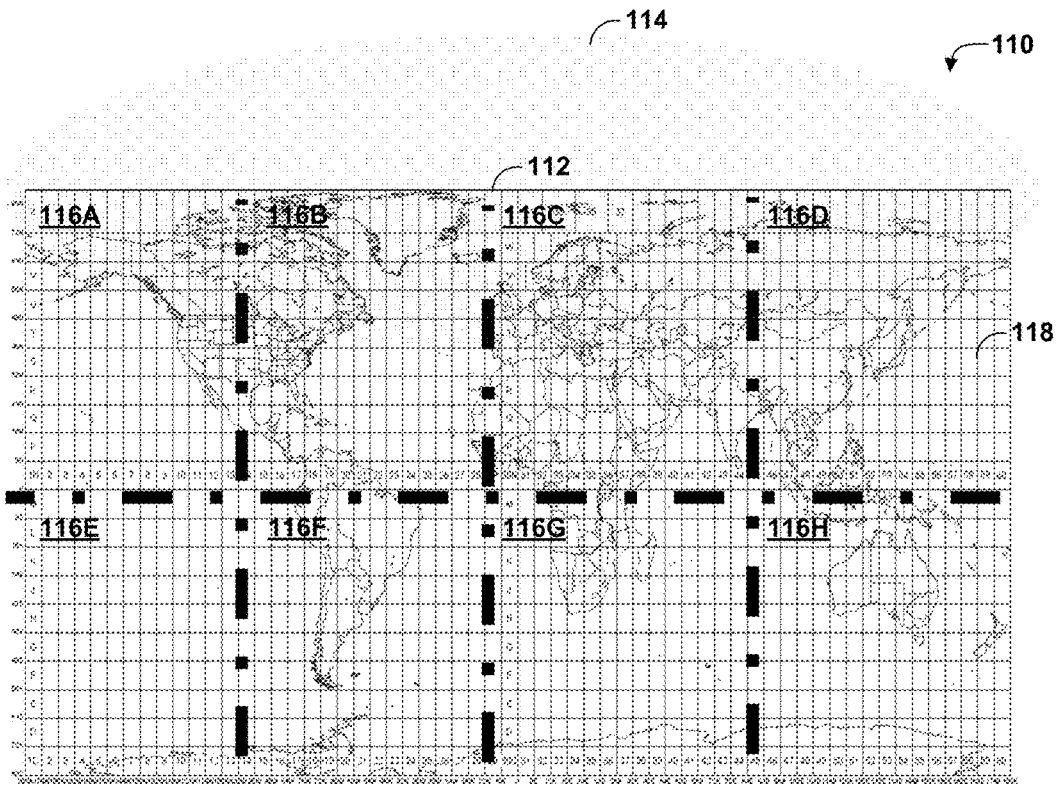

FIGS. 2A and 2B are conceptual diagrams illustrating representations of models for displays used to present panoramic video data. FIG. 2A illustrates an example of a cube map projection 100, while FIG. 2B illustrates equi-rectangular projection 110.

In FIG. 2A, each of 6 faces 102A-102F (faces 102) of cube 104 is divided into four tiles (for a total of 24 tiles). Tiles of visible faces (i.e., faces 102A, 102B, and 102C) are labeled as tiles 106A-106L. In particular, face 102C is divided into four tiles 106A-106D, face 102B is divided into four tiles 106E-106H, and face 102A is divided into four tiles 106I-106L. The tiles of the hidden faces (i.e., faces 102D, 102E, and 102F) are unlabeled in FIG. 2A for purposes of readability, but it should be understood that faces 102D-102F are also divided into tiles, e.g., four tiles. "Tiles" may also be referred to as regions. Each of cube faces 102 in FIG. 2A corresponds to a 90 degree by 90-degree field of view (FOV). Any arbitrary 90×90 degree tile of the sphere may require decoding of one-third ($\frac{1}{3}^{rd}$) of the panorama at high resolution. The FOV rarely spans more than eight tiles. Thus, the span of high resolution decode can be restricted to eight tiles or less, without losing visual quality.

FIG. 2B illustrates canvas 118, which is divided into eight tiles 116A-116H. In this example, when a user is looking at the "poles" of the sphere (e.g., north pole 112, where the user's field of view when looking at north pole 112 is represented by grey shaded area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution. This is significantly more high resolution data than in the example of FIG. 2A. Therefore, the techniques of this disclosure may use cube map projection model 100 for the display.

Referring to the example discussed with respect to FIG. 1 above, in which video data is coded at resolutions including 6k, 4k, HD (1080p), and 720p, in FIG. 2A, front four tiles 106A-106D (also referred to as "regions") may be decoded at 6k resolution, neighboring eight tiles (e.g., tiles 106E, 106G, 106K, and 106L, as well as the unlabeled tiles of faces 102D and 102F that neighbor tiles 106A, 106C, and 106D) may be decoded at 4k resolution, neighboring eight tiles to these eight tiles (i.e., tiles 106F, 106H, 106I, 106J, and the other unlabeled tiles that neighbor the tiles that neighbor tiles 106A, 106C, and 106D) may be decoded at HD (1080p) resolution, and the four back tiles may be decoded at 720p resolution. In this example, the total bandwidth requirement for such video data would be 6.5 MP per frame. In a worse-case scenario in which there is an 8-4-8-4 distribution of tiles across the resolutions in decreasing order, there would be 8.17 MP per frame.

Figure 3A:
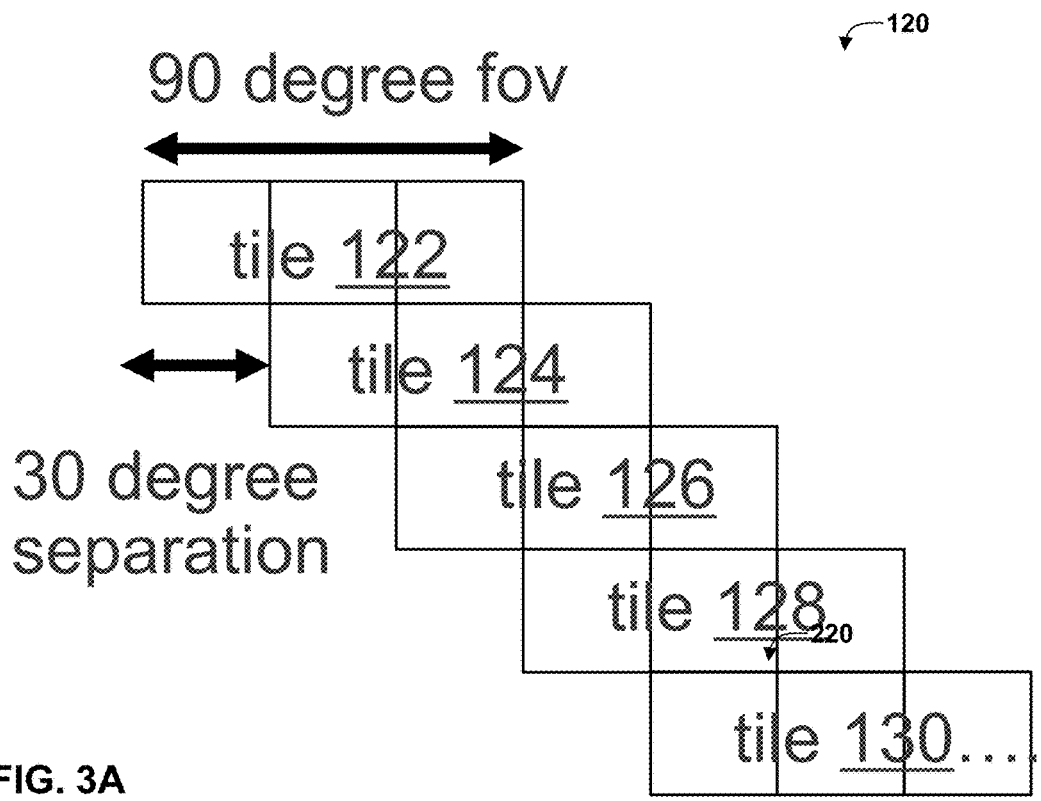
FIG. 3A is a conceptual diagram illustrating an example of cylindrical panorama video data.

FIG. 3A is a conceptual diagram illustrating an example of cylindrical panorama video data 120. Cylindrical panorama video data 120 is partitioned into tiles 122-130. Bit rate reductions may be equally, if not more, important for certain uses than reductions in decoder complexity. For example, some reports indicate that the average U.S. Internet connection speed is 5 mbps, compared to a 30 mbps requirement for conventional, high quality panoramic video data. Carving up multiple small tiles from the panorama may reduce compression efficiency. That is, there may be some loss in temporal prediction efficiency.

In the example of FIG. 3A, the server (e.g., source device 12) may store twelve, 90-degree tiles (tiles 122-130 are shown for purposes of example, although it should be understood that additional tiles would be included to form all twelve tiles). The twelve, 90-degree tiles would be equivalent to three copies of the panorama. This example may be used to avoid small tiles, which means that compression efficiency is not compromised. In addition, 12×30 degree tiles may also be stored. An arbitrary 90-degree view would then require at the most four 30 degree tiles, where one 30-degree tile and one 90-degree tile can be used to compose an arbitrary 90-degree view.

A bitrate optimization for spherical panorama video data 120 may be achieved using the techniques of this disclosure. The idea of trading off storage space to save bitrate can be generalized to other cases. For instance, it is not necessary that the same tile granularity is available at all the viewing angles. Unlike the cylindrical panorama case, covering all the viewpoints with equal tile granularity is not trivial for spherical panoramas.

In general, video encoder 20 may save copies of spherical panorama video data 120 at multiple tile granularities. Bigger tiles than tiles 122-130 (not shown) can have overlapping fields of views between them in some places for better coverage. For example, video encoder 20 may encode the most interesting viewpoints (as determined by a user, such as an administrator, who is preparing the content) at larger tile sizes. In this manner, source device 12 may send a combination of multiple sized tiles, e.g., a large tile (e.g., four times the tile size of one of tiles 122-130) for a region at which a visual focus of a user is directed, and smaller tiles for the other remaining regions (for a total of 21 tiles, with respect to the example of FIG. 2A).

Figure 3B:
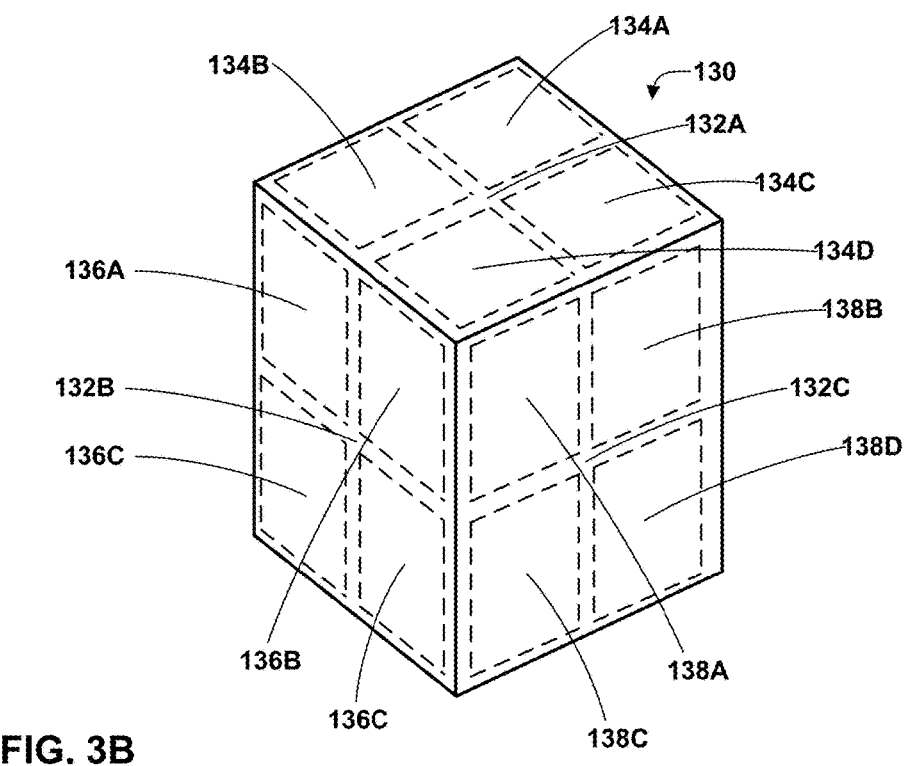
FIG. 3B is a conceptual diagram illustrating an example tile coding in a cuboidal projection.

FIG. 3B is a conceptual diagram illustrating an example tile coding in a cuboidal projection 130. Cuboidal projection 130 includes cube faces 132A, 132B, 132C, as shown, and includes additional cube faces, which are unshown because they are obstructed. In this example, each of the cube faces of cuboidal projection 130 is divided into four tiles: cube face 132A is divided into four tiles 134A-134D, cube face 132B is divided into four tiles 136A-136D, and cube face 132C is divided into four tiles 138A-138D. The other, unshown cube faces would also be divided into four respective tiles, in this example, for a total of 24 small tiles. In general, video source 12 may provide video data for each of the tiles (e.g., tiles 134A-134D, 136A-136D, 138A-138D, and the tiles of the unshown cube faces).

In addition, video source 12 may provide video data for large tiles, which may cover each of the cube faces. For example, video source 12 may provide video data for a tile covering cube face 132A, video data for a tile covering cube face 132B, video data for a tile covering cube face 132C, and video data for tiles covering the unshown cube faces. In some examples, video encoder 20 may encode larger tile sizes only for those viewpoints which are more likely to be viewed. Thus, if it is unlikely that a user would look up or down, video encoder 20 may only code video data for large tiles covering cube faces 132B and 132C, and for opposing cube faces to cube faces 132B and 132C, but not, for example, cube face 132A. Optionally, each of the tiles may have left and right views for stereo video data.

Video encoder 20 may prepare the video data for a stereo video case to improve latency when destination device 14 switches from a low resolution stream to a high resolution stream. The techniques of this disclosure may avoid introduction of additional motion to photon (m2p) latency. In general, latency during the transition from, e.g., low resolution to high resolution (when the user moves his/her head) can be large. The maximum latency is equal to the latency from a heads-up display (HUD) to server and back (e.g., the roundtrip latency between destination device 14 and server device 12) plus the length of a GOP structure or time until next I-frame is decoded. However, the scenario where content at different resolutions is available at the HUD (either stored locally in a file or streamed) causes the network delay portion to be 0 in the maximum latency calculation above.

Figure 4:
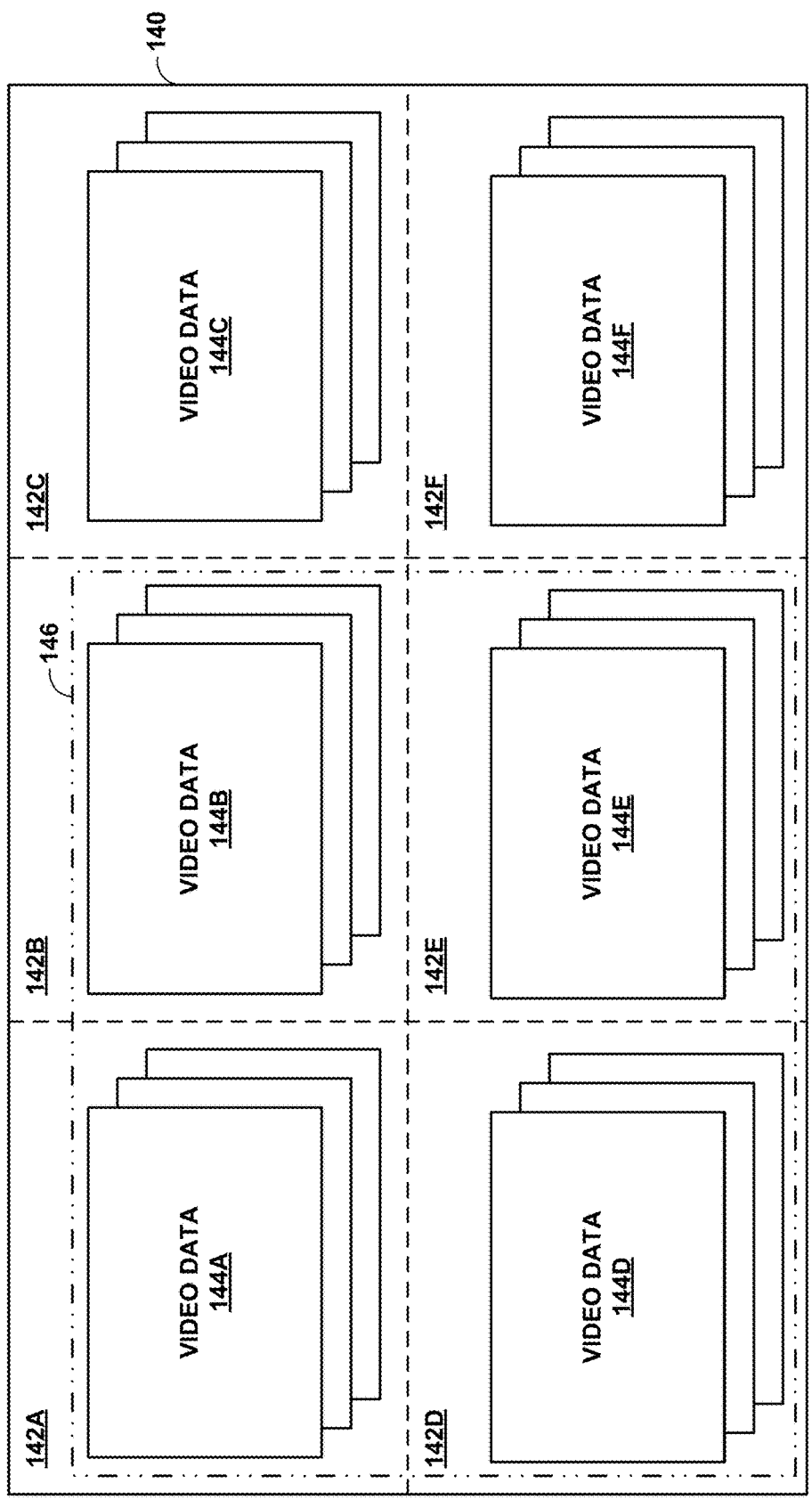
FIG. 4 is a conceptual diagram illustrating an example canvas divided into regions.

FIG. 4 is a conceptual diagram illustrating an example canvas 140 divided into regions 142A-142F (regions 142). For purposes of discussion, canvas 140 is divided as a rectangle into rectangular regions 142, although it should be understood that this discussion may apply to a cube map projection similar to cube map projection 100 as shown in FIG. 2A.

In accordance with the techniques of this disclosure, various sets of video data may be provided for each of regions 142. In the example of FIG. 4, video data 144A is provided for region 142A, video data 144B is provided for region 142B, video data 144C is provided for region 142C, video data 144D is provided for region 142D, video data 144E is provided for region 142E, and video data 144F is provided for region 142F. Each of video data 144A-144F may include video data encoded at a variety of quality levels, e.g., spatial resolutions. For example, each of video data 144A-144F may include video data encoded at four proportional spatial resolutions, such as 6K resolution (that is, having pixel density of 6K resolution), 4K resolution, 1080P resolution, and 720P resolution.

In some examples, video data may be provided that covers a plurality of regions 142. In the example of FIG. 4, video data 146 is provided that covers regions 142A, 142B, 142D, and 142E. Thus, if a user's focus is directed at a field of view including regions 142A, 142B, 142D, and 142E, destination device 14 may simply retrieve video data 146, rather than retrieving individual sets of video data from video data 144A, 144B, 144D, 144E. In some examples (such as that shown in FIG. 4), only a single quality (e.g., spatial resolution) is provided that covers multiple regions, although in other examples, multiple qualities may be provided for multiple regions.

Figure 5:
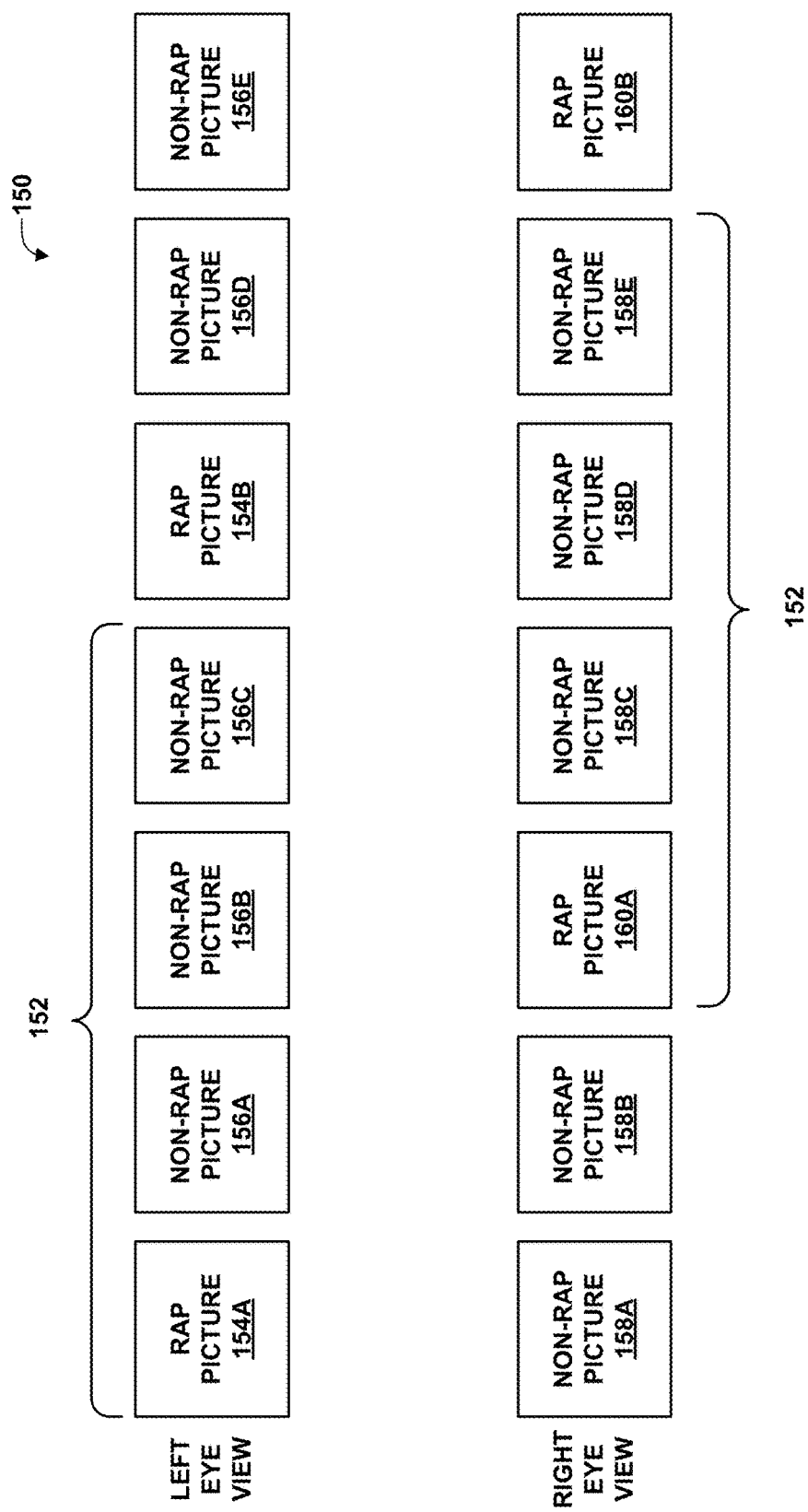
FIG. 5 is a conceptual diagram illustrating sequences of video data for two views, a left eye view and a right eye view.

FIG. 5 is a conceptual diagram illustrating sequences 150 of video data for two views, a left eye view and a right eye view. In particular, in this example, the left eye view includes random access point (RAP) pictures 154A, 154B and non-RAP pictures 156A-156E, and the right eye view includes non-RAP pictures 158A-158E and RAP pictures 160A, 160B. RAP pictures may also be referred to as switch points. A group of pictures (GOP) generally refers to a sequence of pictures including a RAP picture and subsequently non-RAP pictures in coding order up to the next RAP picture. In this example, GOPs have a GOP period 152 of four pictures, although it should be understood that this example period is shown for purposes of example. In general, the GOP period can be of any length/number of pictures.

Furthermore, the pictures of left eye view and the right eye view generally have the same quality for purposes of the techniques of this disclosure (e.g., the same spatial resolution). Thus, in general, these pictures would be retrieved for the left eye view and the right eye view together when a particular quality is selected, based on a region at which a visual focus of a user is directed. The user's visual focus may be determined, for example, using accelerometers, camera tracking, or other such methods.

In accordance with certain example techniques of this disclosure, GOP structure related latency (max I-frame delay) can be reduced in the case of stereo video data, as follows. Left and right channel I-frames (e.g., RAP pictures 154A, 154B, 160A, 160B) can be offset in time from each other by one-half GOP period. Thus, the delay to the I-frame, either at the left channel or right channel, will always be less than or equal to ½ GOP period. The human eye may be able to perceive improvement in picture quality if higher resolution content is observed by either eye. Thus, the perceived latency when shifting from low resolution to high resolution may be reduced by ½ of a GOP period, using these techniques.

Accordingly, in the example of FIG. 5, RAP pictures of the right eye view occur halfway between the GOP periods of RAP pictures of the left eye view. That is, RAP picture 160A of the right eye view occurs halfway between RAP pictures 154A, 154B of the left eye view, and RAP picture 154B of the left eye view occurs halfway between RAP pictures 160A, 160B of the right eye view.

Thus, if a switch to the pictures of the left eye view and the right eye view were to occur at, e.g., RAP picture 154A and non-RAP picture 158A, destination device 14 may switch to the left eye view before switching to the right eye view. That is, destination device 14 may retrieve RAP picture 154 and non-RAP picture 156A of the left eye view, but continue to retrieve right eye view pictures having a different quality (e.g., spatial resolution) instead of non-RAP pictures 158A, 158B. Then, upon reaching RAP picture 160A, destination device 14 may retrieve non-RAP picture 156B and RAP picture 160A. This may reduce GOP structure related latency, vis-à-vis if both RAP pictures for the left and right eye views occurred at the position of RAP picture 160A.

Similarly, if the switch were to occur at the position of RAP picture 160A, destination device 14 may retrieve RAP picture 160A and non-RAP picture 158C of the right eye view, but continue to retrieve pictures of a previous left eye view instead of non-RAP pictures 156B, 156C. Upon reaching RAP picture 154B, though, destination device 14 may retrieve RAP picture 154B and non-RAP picture 158D.

Figure 6:
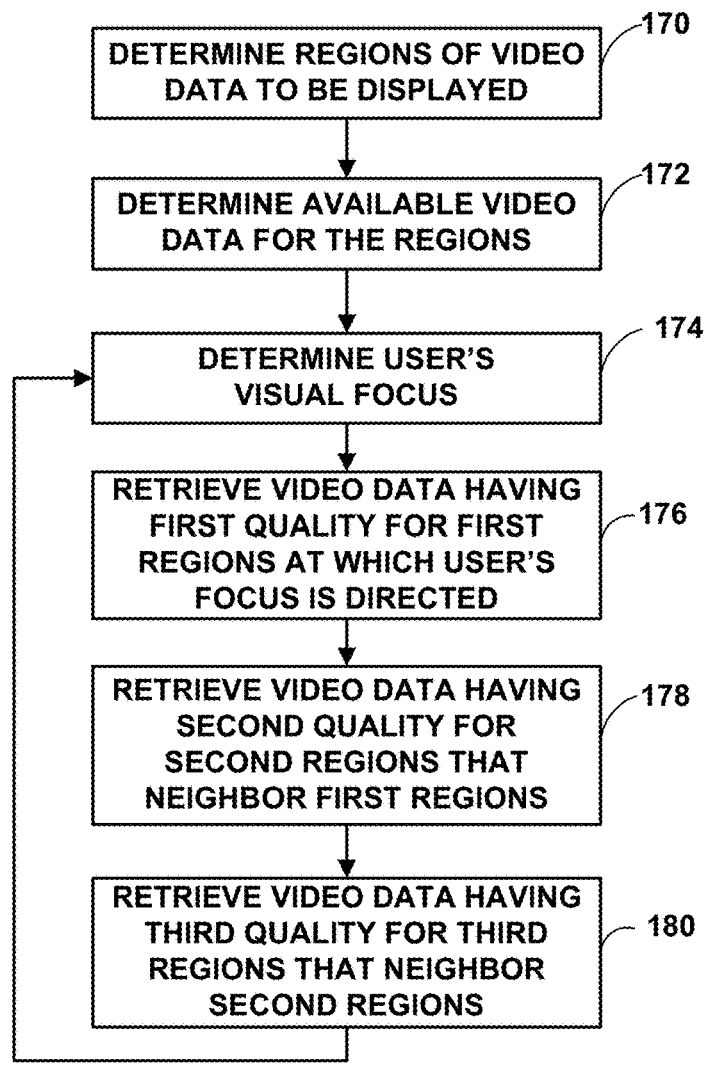
FIG. 6 is a flowchart illustrating an example method according to the techniques of this disclosure.

FIG. 6 is a flowchart illustrating an example method according to the techniques of this disclosure. The method of FIG. 6 is explained with respect to destination device 14 of FIG. 1, although it should be understood that other devices may be configured to perform the same or a similar method.

Initially, region determination unit 34 of destination device 14 determines regions of video data to be displayed (170). That is, region determination unit 34 determines regions of a canvas (or display) for which to obtain video data. For example, the regions may correspond to tiles as explained above with respect to FIGS. 2A and 3, and/or regions as explained above with respect to FIG. 4.

Region determination unit 34 may then determine available video data for each of the regions (172). For example, region determination unit 34 may determine whether video data is available that covers multiple regions (e.g., video data 146 of FIG. 4). Region determination unit 34 may also determine qualities of the various sets of video data for each of the regions. The quality may refer to, for example, spatial resolution (that is, pixel density) of the video data. Additionally or alternatively, the quality may refer to bitrate of the video data, quantization parameters (QPs) for blocks or slices of the video data, or the like.

Region determination unit 34 may also determine one or more of the regions at which a visual focus of a user is directed (174). For example, region determination unit 34 may determine that a user's visual focus is directed to a position on the canvas that covers one or more of the regions, e.g., a 90×90 degree field of view (FOV), as explained above with respect to FIG. 2A. Region determination unit 34 may further determine which of the regions are within the user's field of view (i.e., a first subset of regions), a second subset of regions that neighbor the first subset of regions (i.e., those within the user's field of view), and a third subset of regions that neighbor the second subset of regions. Region determination unit 34 may determine additional subsets as well.

Region determination unit 34 may then retrieve (or cause another unit of destination device 14 to retrieve) video data having a first quality for the first subset of regions, i.e., the regions at which the user's focus is directed (176). Again, the quality may refer to spatial resolution, pixel density, bitrate, quantization parameter (QP), or other quality metrics of the video data (e.g., peak signal to noise ratio (PSNR)). Furthermore, region determination unit 34 may retrieve individual sets of video data for each region, or a set of video data that covers multiple regions in the first subset of regions. For example, if the user's visual focus had a field of view that covered regions 142A, 142B, 142D, and 142E of canvas 140 of FIG. 4, region determination unit 34 could retrieve sets of video data from video data 144A, 144B, 144D, and 144E, or video data 146 that covers each of regions 142A, 142B, 142D, and 142E.

Region determination unit 34 may also retrieve video data having a second quality for the second subset of regions that neighbor the first subset of regions (178). The second quality may be lower than the first quality. Furthermore, region determination unit 34 may retrieve video data having a third quality for the third subset of regions that neighbor the second subset of regions (180). The third quality may be lower than the first quality. Although not shown, if there are additional subsets of regions, region determination unit 34 may also retrieve video data for those regions, having a quality equal to or lower than the third quality.

As shown in the example of FIG. 6, following step 180, the method returns to step 174. Thus, if the user's visual focus has shifted, region determination unit 34 may select different sets of video data based on the new set of regions at which the user's visual focus is directed. Although not shown in FIG. 6, it should be understood that after retrieving the sets of video data, destination device 14 may decode and present the video data. For example, video decoder 30 may decode the retrieved video data for each of the regions, and output the decoded video data to display device 32 for presentation.

Moreover, in the event that the user's visual focus changes and the video data includes two or more views (e.g., for three-dimensional playback), region determination unit 34 may switch sets of video data for the views at different times, as explained with respect to FIG. 5. That is, random access points (RAPs) of the views, also referred to as switch points, may be offset between the views, which may reduce latency associated with switching from one set of video data to another. In this manner, video data may be retrieved from one set of video data for one view having a higher quality than video data retrieved from another set of video data for another view, until a RAP picture of the other view can be retrieved.

In this manner, the method of FIG. 6 represents an example of a method of retrieving video data including determining a plurality of regions of video data to be displayed via a display, retrieving video data having a first quality for a first subset of the plurality of regions at which a visual focus of a user is directed, retrieving video data having a second quality for a second subset of the plurality of regions that neighbor the first subset of the plurality of regions, wherein the second quality is lower than the first quality, and retrieving video data having a third quality for a third subset of the plurality of regions that is outside the first subset and the second subset, wherein the third quality is lower than the second quality.

Quality of the various sets of video data may be defined according to one or more characteristics. As explained above, one example quality metric is spatial resolution (that is, pixel density). Another possible quality metric, which may be used in addition or in the alternative, is bitrate of the corresponding video data. In this manner, different representations of video data (e.g., in accordance with Dynamic Adaptive Streaming over HTTP (DASH)) may be provided for each of the regions. For example, various representations may be provided for each of the regions, and in some examples, one or more representations may be provided that correspond to multiple regions. Each of the representations for a given region (or set of regions) may generally be switchable to the others, e.g., such that switch points or random access points (RAPs) may be aligned between the representations.

Furthermore, each of the representations for a given region (or set of regions) may have a distinct bitrate. A manifest file, such as a media presentation description (MPD) may include metadata for the representations, such as bitrates of the representations, uniform resource locators (URLs) for segments of the representations, and/or a mapping of representations to regions of the display. The metadata/manifest file may also describe locations of switch points within the representations. In this manner, destination device 14 may select a representation for a region based on a user's visual focus (and thus, the region's proximity to the user's field of view) and quality of the representation, which may refer to the bitrate of the representation. Other examples of quality characteristics include quantization parameters (QPs) for blocks, slices, and/or pictures in the video data, peak signal to noise ratio (PSNR) for the video data, and bitrates for the video data.

Figure 7:
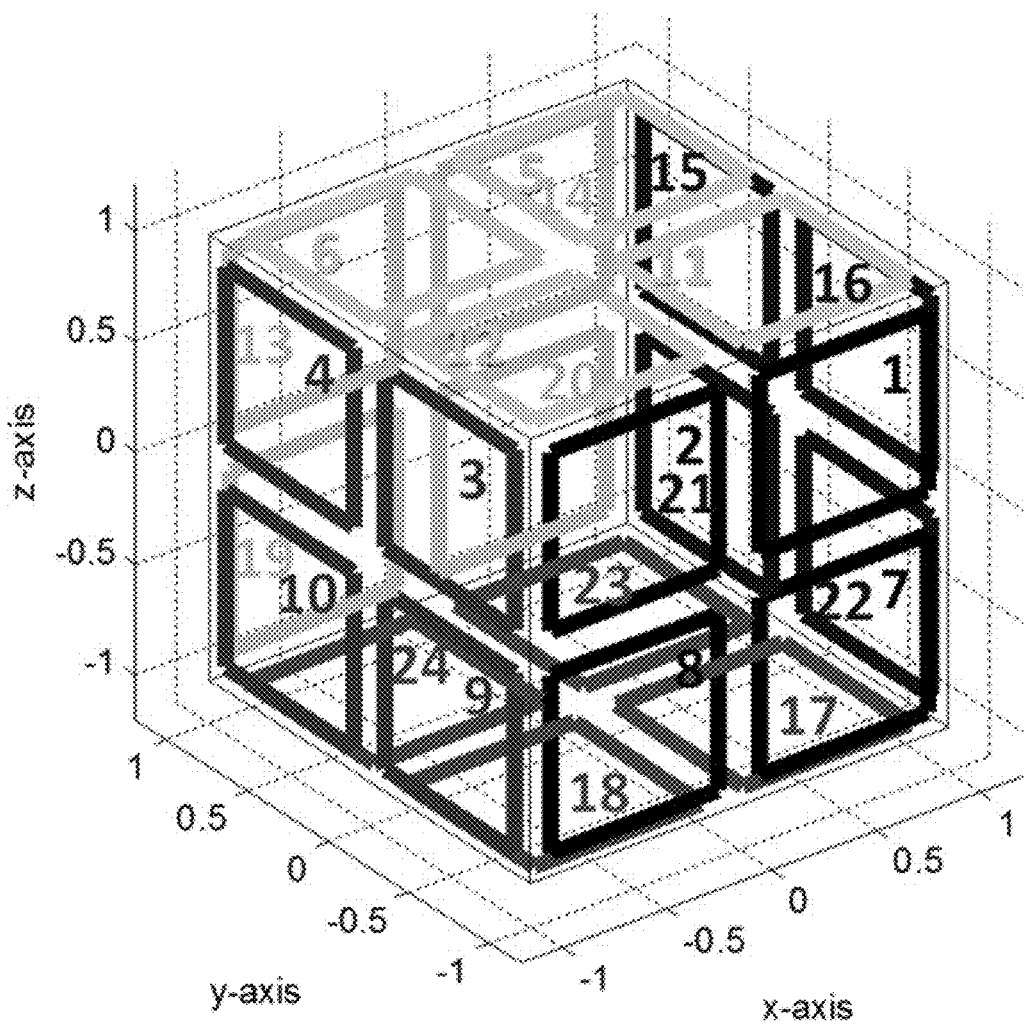
FIG. 7 is a conceptual diagram illustrating a cube having six faces, each divided into four tiles, for a total of twenty-four tiles (or regions).

FIG. 7 is a conceptual diagram illustrating a cube having six faces, each divided into four tiles, for a total of twenty-four tiles (or regions). The tiles are represented in a three dimensional x, y, and z axis space with each square face shown having a one-unit by one-unit area in the corresponding two dimensional space. A first face contains tiles 3, 4, 9, and 10, a second face contains tiles 1, 2, 7, and 8, a third face contains tiles 15, 16, 21, and 22, a fourth face contains tiles 13, 14, 19, and 20, a fifth face contains 5, 6, 11, and 12, and a last, sixth face contains tiles 17, 18, 23, and 24.

An example algorithm for requesting video data for tiles, the video data having different qualities (e.g., spatial resolutions), based on a user's field of view (FOV) is described with respect to FIGS. 7 and 8 below. Destination device 14 (e.g., region determination unit 34) may be configured to perform this or a similar algorithm.

It is assumed that region determination unit 34 receives a cubemap input having a twenty-four tile configuration (four tiles per cube face) as shown in FIG. 7. It is assumed that video data is available for each of the tiles at four qualities (e.g., resolution layers), and that the tile numbers follow the order shown in FIG. 7.

Figure 8:
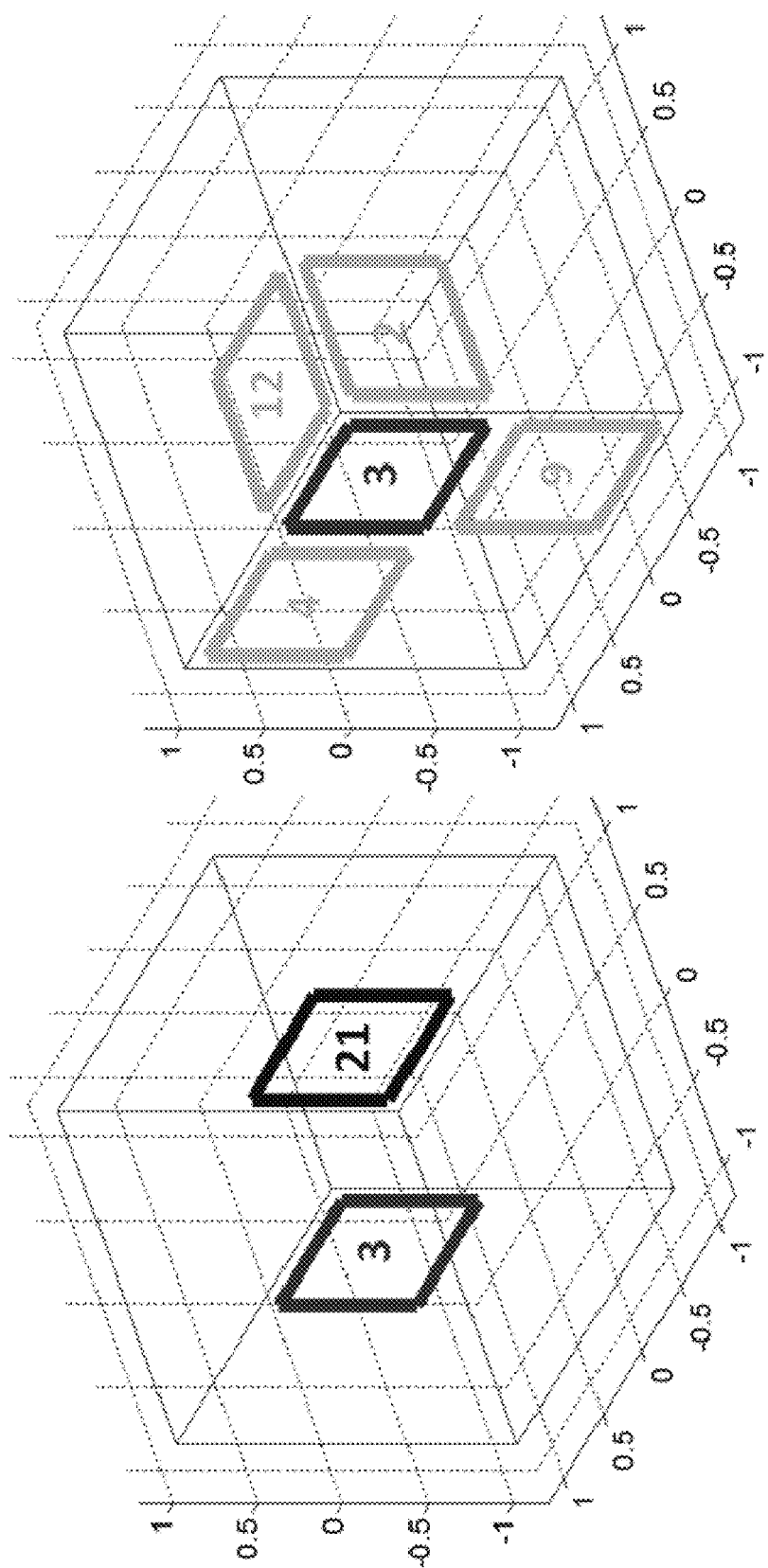
FIG. 8 is a conceptual diagram illustrating examples of opposite tiles and adjacent tiles for an example tile of FIG. 7.

FIG. 8 is a conceptual diagram illustrating examples of opposite tiles and adjacent tiles for tile number 3 of FIG. 7. For each tile on the cube structure, its opposite tile is defined as the tile obtained by mirroring the tile location through the center of the cube. The four adjacent tiles to a current tile (e.g., tile 3) are the four tiles that have adjacent edges in the cube structure with the current tile. For example, as illustrated in FIG. 8, the opposite tile of tile number 3 is tile 21. The adjacent tiles of tile number 3 are tiles 2, 4, 9 and 12.

The opposite tile number and four adjacent tile numbers for each tile in the cube structure may be saved in a Look-up-Table in a memory of destination device 14, e.g., a memory of region determination unit 34.

Given a user's FOV, destination device 14 may execute the algorithm to solve the problem of assigning the twenty-four tiles of the cube structure to different qualities (e.g., resolution layers) of video data, with layer one being the highest quality (e.g., resolution), and layer four being the lowest quality (e.g., resolution). Based on the user's requested FOV, destination device 14 executes the algorithm to first calculate the area of the FOV that is covered by each tile. For purposes of explanation, resolution is used as an example of quality in the discussion below, although it should be understood that additional and/or alternative quality metrics may be used.

According to the algorithm, destination device 14 defines a threshold for area coverage $A_{th}$ (for example, 5% of the total area of the cube map projection). All tiles that cover an area larger than or equal to the threshold $A_{th}$ (that is, tiles having an area larger than the threshold area, e.g., larger than or equal to 5% of the total area of the cube map projection, where area may be calculated in pixels) are assigned to resolution layer one. Destination device 14 assigns opposite tiles of layer one tiles to layer four. Destination device 14 assigns tiles that have non-zero area coverage smaller than the threshold $A_{th}$ to resolution layer two, and opposite tiles of layer two tiles to layer three. At this stage, the algorithm has usually caused destination device 14 to assign most of the 24 tiles to their corresponding resolution layers.

For each of the remaining unassigned tiles, destination device 14 may calculate a tile metric $T_A$. The tile metric $T_A$ for a certain tile equals the sum of the FOV areas covered by its 4 adjacent tiles. For example, $T_A$ for tile 3=sum of FOV areas covered by tiles 2, 4, 9 and 12. Destination device 14 may sort the remaining unassigned tiles in a descending order based on their $T_A$ metric. Destination device 14 may assign half of the remaining tiles with the highest $T_{AS}$ to resolution layer two, and the other half with the lowest $T_{AS}$ to resolution layer three.

Note that the algorithm only relies on the area coverage of each tile. Hence, the complexity of tile assignment is low. Using a threshold for area coverage $A_{th}$ may control the maximum number of tiles to be requested from the highest resolution layer one. The algorithm also balances the requests from different resolution layers by enforcing conditions: number of layer one tiles=number of layer four tiles, and number of layer two tiles=number of layer three tiles, in the example discussed above. Therefore, the algorithm can control the worst case maximum number of the total decoded pixels on the viewer's device, and ensure that this number is within the capabilities of the end user decoder (e.g., video decoder 30).

The tile request algorithm discussed above can be simplified to fewer resolution layers. For example, if there are only three resolution layers, then the same algorithm can be performed, but tile assignments from resolution layers two and three (or layers three and four) may be combined into a single resolution layer. The algorithm can be extended to use more than four resolution layers by defining more than one threshold for FOV area coverage. Finally, the algorithm can be also be extended to cover different geometrical representation of the input 360 degree video, other than the CubeMap input with twenty-four tiles.

Figure 9:
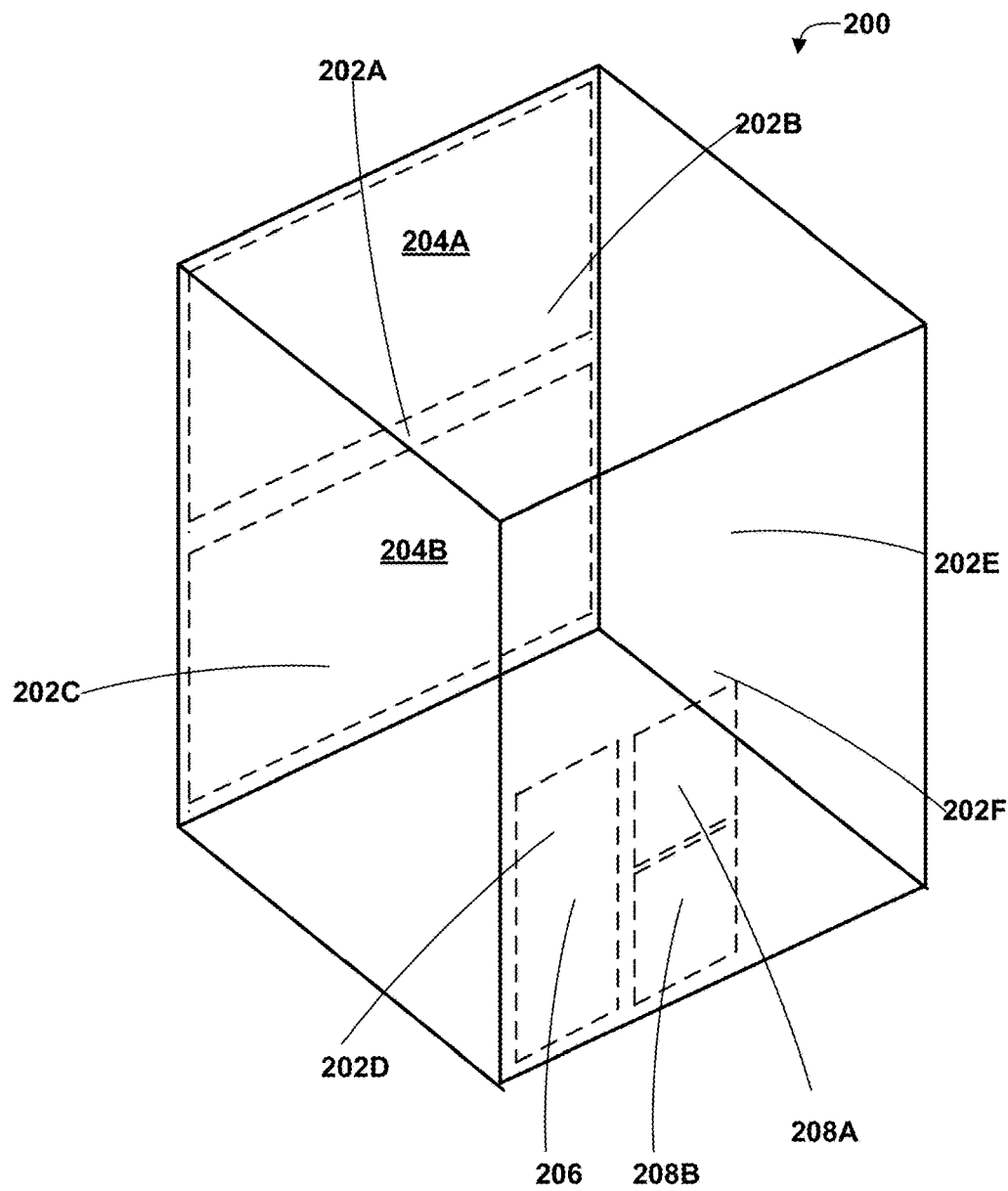
FIG. 9 is a conceptual diagram illustrating an example cube map projection.

FIG. 9 is a conceptual diagram illustrating an example cube map projection 200. Cube map projection 200 includes six faces 202A-202F (faces 202), including front face 202A, top face 202B, left face 202C, bottom face 202D, right face 202E, and rear face 202F. In this example, any or all of faces 202 may be divided into regions (also referred to as tiles herein). For example, each of faces 202 may be divided into four tiles, including an upper-left tile, an upper-right tile, a lower-left tile, and a lower-right tile. A source device, such as source device 12 (FIG. 1), may provide video data at a variety of quality levels (e.g., spatial resolutions, QPs, bitrates, PSNRs, or the like) for each of the tiles.

In addition, two or more of the tiles may be combined. For example, as discussed above (e.g., with respect to FIG. 4), source device 12 (FIG. 1) may provide video data for a large tile, which may encompass four small tiles. For example, the large tile may cover an entire one of faces 202. Thus, a separate set of video data may be available for the large tile, which may include one or more quality levels for the large tile.

Although a large tile covering a single one of faces 202 is possible as discussed above, in other examples, smaller tiles may be combined in other ways, such that video data is available for other tile combinations. In the example of FIG. 9, two horizontal tiles 204A, 204B are shown on front face 202A. Thus, although front face 202A may generally be partitioned into the four tiles discussed above, the upper-left and upper-right tiles may be combined to form horizontal tile 204A, and the lower-left and lower-right tiles may be combined to form horizontal tile 204B. In this manner, source device 12 (FIG. 1) may provide video data at one or more quality levels for horizontal tiles 204A, 204B.

Accordingly, depending on a user's FoV, destination device 14 (FIG. 1), and in particular, region determination unit 34, may determine that video data should be retrieved for either or both of horizontal tiles 204A, 204B. For example, if a user's FoV is directed to or near the center of the edge bordering front face 202A and top face 202B, region determination unit 34 may retrieve a high-quality version of video data for horizontal tile 204A, or an intermediate-quality version of the video data for horizontal tile 204A.

In addition, FIG. 9 also shows examples of smaller tiles. For example, source device 12 (FIG. 1) may provide video data for half-tiles, such as half-tile 206, or quarter-tiles, such as quarter tiles 208A, 208B. In general, video data may be provided for any of a variety of partitionings of cube map 200. Thus, it should not be assumed that only four tiles per cube face are possible, as any number of partitionings into tiles may be used in accordance with the techniques of this disclosure.

Figure 10:
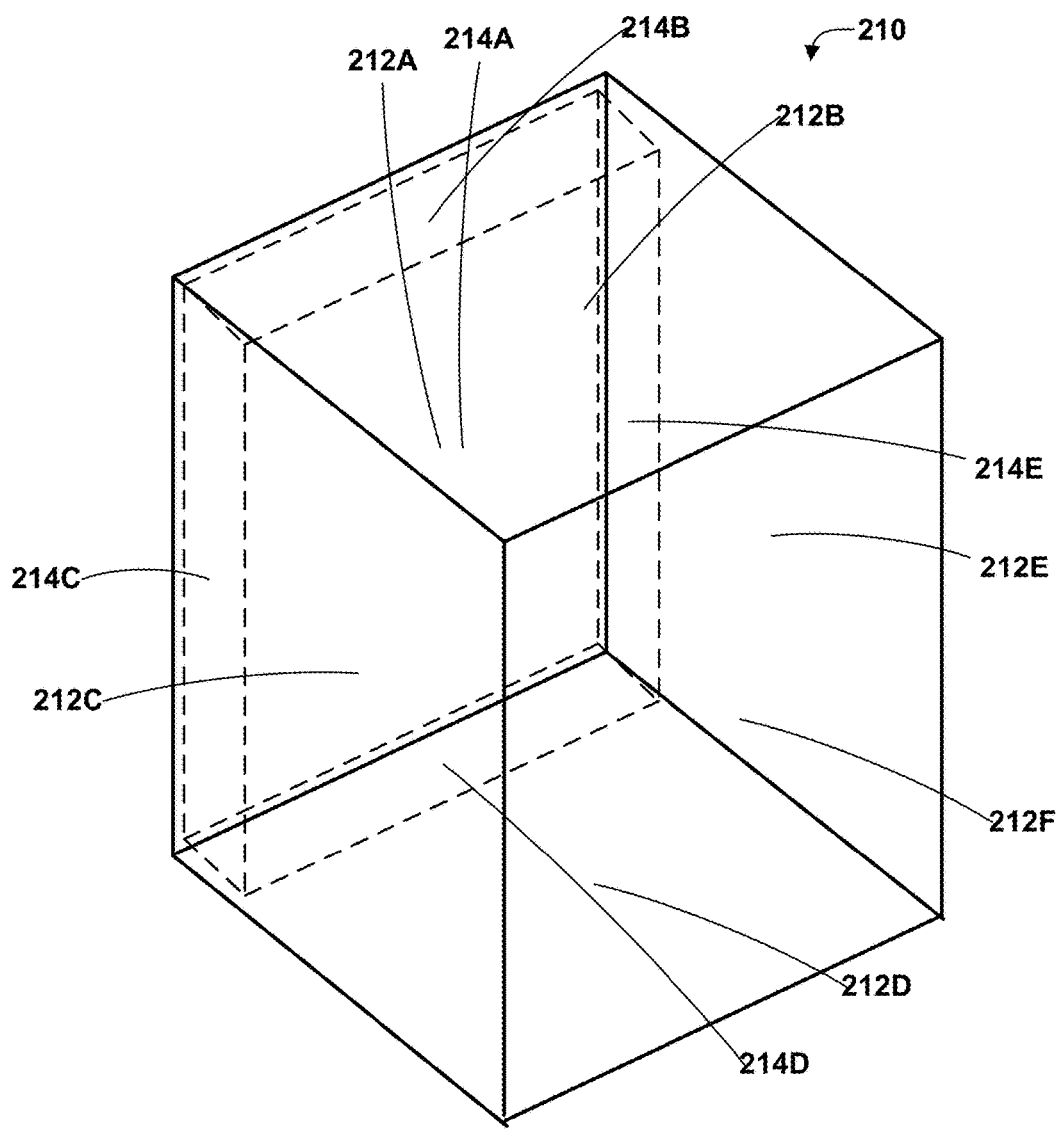
FIG. 10 is a conceptual diagram illustrating another example cube map projection.

FIG. 10 is a conceptual diagram illustrating an example cube map projection 210. Cube map projection 210 includes six faces 212A-212F (faces 212), including front face 212A, top face 212B, left face 212C, bottom face 212D, right face 212E, and rear face 212F.

As discussed above, source device 12 (FIG. 1) may provide video data for tiles of cube faces, such as faces 212, where there may be four tiles each for faces 212. In addition, however, source device 12 may provide video data for a "mega-tile" that covers, for example, an entire cube face and portions of neighboring cube faces. In the illustrated example of FIG. 10, such a mega-tile covers regions 214A-214E, where region 214A fully covers front face 212A, region 214B partially covers top face 212B, region 214C partially covers left face 212C, region 214D partially covers bottom face 212D, and region 214E partially covers right face 212E. The mega tile in this example does not cover any portion of rear face 212F.

In addition, source device 12 may provide a plurality of such mega-tiles (which may be referred to as cube-face-centered mega-tiles). The example mega-tile shown in FIG. 10 is centered on front face 212A. In some examples, source device 12 may provide six such mega-tiles, one mega-tile centered on each of faces 212. Furthermore, in addition or in the alternative, source device 12 may provide mega-tiles centered at corner vertices of cube map projection 210, as discussed below.

Figure 11:
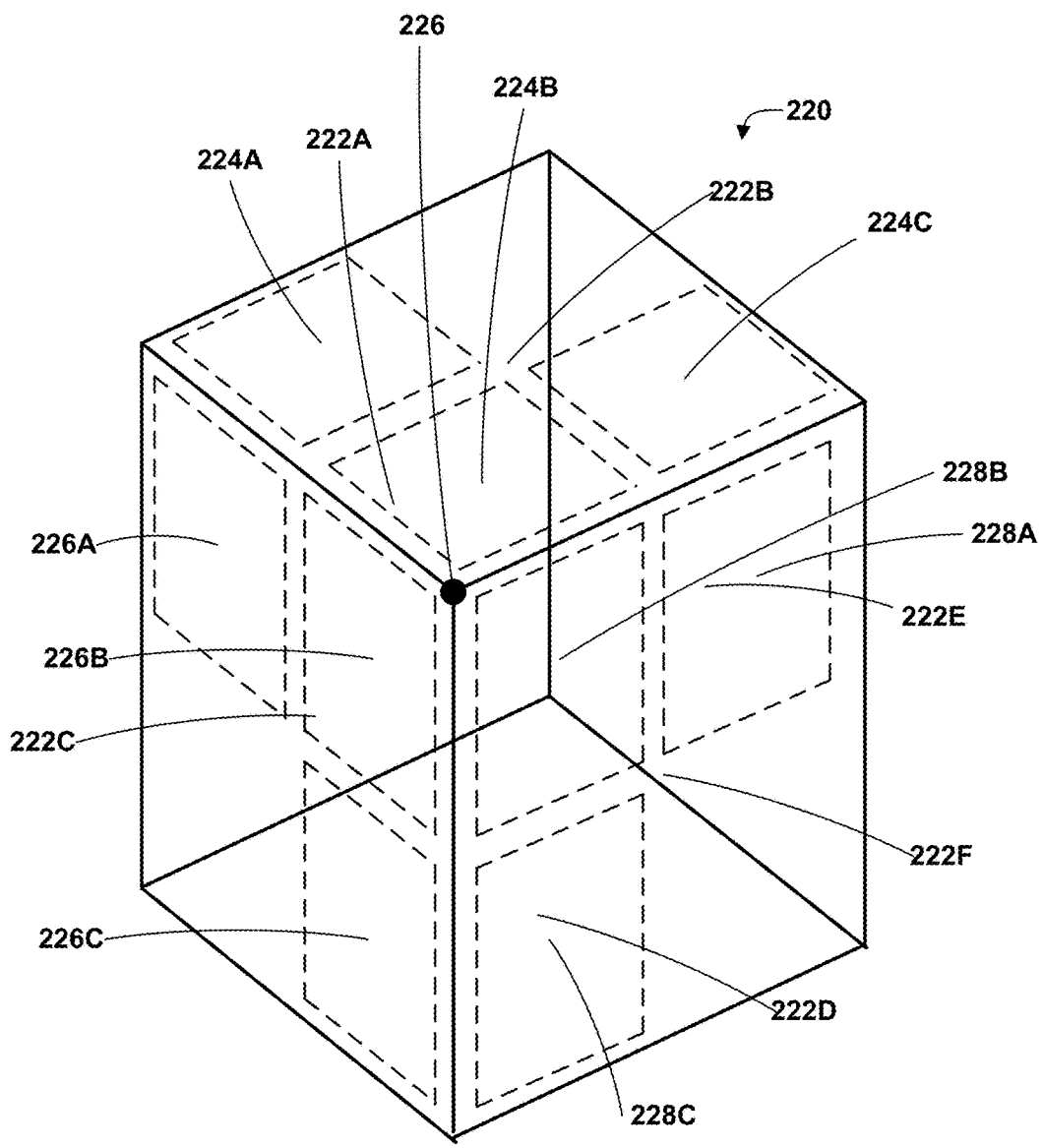
FIG. 11 is a conceptual diagram illustrating another example cube map projection.

FIG. 11 is a conceptual diagram illustrating an example cube map projection 220. Cube map projection 220 includes six faces 222A-222F (faces 222), including front face 222A, top face 222B, left face 222C, bottom face 222D, right face 222E, and rear face 222F. The example of FIG. 11 also depicts a mega-tile centered on vertex 226 of cube map projection 220. In particular, the mega-tile includes tiles 224A, 224B, and 224C on top face 222B, tiles 226A, 226B, and 226C of left face 222C, and tiles 228A, 228B, and 228C on rear face 222F.

Source device 12 (FIG. 1) may provide a plurality of such mega-tiles (which may be referred to as vertex-centered mega-tiles). For example, source device 12 may provide eight such mega-tiles, one mega-tile for each corner vertex of cube map projection 220. The techniques of FIG. 11 may be combined with the techniques of FIG. 10, such that source device 12 may provide fourteen mega-tiles, six cube-face-centered mega-tiles and eight vertex-centered mega-tiles.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving video data, the method comprising:
    determining a plurality of regions of video data to be displayed via a display, each of the plurality of regions having a plurality of qualities of video data available for retrieval;
    determining a first subset of the plurality of regions at which a visual focus of a user is directed;
    retrieving video data having a first quality of the plurality of qualities for the first subset of the plurality of regions at which the visual focus of the user is directed;
    retrieving video data having a second quality of the plurality of qualities for a second subset of the plurality of regions that neighbor the first subset of the plurality of regions, wherein the second quality is lower than the first quality; and
    retrieving video data having a third quality of the plurality of qualities for a third subset of the plurality of regions that is outside the first subset and the second subset, wherein the third quality is lower than the second quality.

2. The method of claim 1,
    wherein retrieving the video data having the first quality comprises retrieving video data having a first spatial resolution,
    wherein retrieving the video data having the second quality comprises retrieving video data having a second spatial resolution that is lower than the first spatial resolution, and wherein the video data for the second subset of the plurality of regions is coded independently of the video data having the first spatial resolution, and
    wherein retrieving the video data having the third quality comprises retrieving video data having a third spatial resolution that is lower than the second spatial resolution, and wherein the video data for the third subset of the plurality of regions is coded independently of the video data having the first spatial resolution and the video data having the second spatial resolution.

3. The method of claim 1,
    wherein retrieving the video data having the first quality comprises retrieving one or more base layers of the video data for the first subset of the plurality of regions and a first set of one or more enhancement layers of the video data for the first subset of the plurality of regions,
    wherein retrieving the video data having the second quality comprises retrieving one or more of the base layers of the video data for the second subset of the plurality of regions and a second set of one or more enhancement layers of the video data for the second subset of the plurality of regions, and
    wherein retrieving the video data having the third quality comprises retrieving one or more of the base layers of the video data for the third subset of the plurality of regions and not retrieving any enhancement layers for the third subset of the plurality of regions.

4. The method of claim 1,
    wherein retrieving the video data having the first quality comprises retrieving a first set of one or more representations of the video data for the first subset of the plurality of regions having first bitrates,
    wherein retrieving the video data having the second quality comprises retrieving a second set of one or more representations of the video data for the second subset of the plurality of regions having second bitrates lower than the first bitrates, and
    wherein retrieving the video data having the third quality comprises retrieving a third set of one or more representations of the video data for the third subset of the plurality of regions having third bitrates lower than the second bitrates.

5. The method of claim 1, wherein the first subset of the plurality of regions comprises two or more regions, wherein video data is separately available for each of the two or more regions, the method further comprising:
    determining whether a single set of video data is available for each of the two or more regions; and
    when the single set of video data is available for each of the two or more regions, retrieving the single set of video data without retrieving the video data that is separately available for each of the two or more regions.

6. The method of claim 1, further comprising:
    determining that the focus of the user has been redirected to a fourth subset of the plurality of regions;
    in response to the determination that the focus of the user has been redirected:

retrieving video data having the first quality for the fourth subset of the plurality of regions;

retrieving video data having the second quality for a fifth subset of the plurality of regions that spatially neighbor the fourth subset of the plurality of regions; and retrieving video data having the third quality for a sixth subset of the plurality of regions that is outside the fourth subset and the fifth subset.

7. The method of claim 6, wherein the fourth subset at least partially overlaps the second subset.

8. The method of claim 1, wherein retrieving the video data comprises retrieving a left-eye view and a right-eye view for each of the regions.

9. The method of claim 8, wherein for at least one of the regions, the left-eye view includes switch points at a regular interval, the right-eye view includes switch points at the regular interval, and the switch points of the right-eye view have different playback times than the switch points of the left-eye view.

10. The method of claim 9, wherein the switch points of the right eye view occur half-way between the switch points of the left-eye view.

11. The method of claim 9, further comprising, in response to determining that the focus of the user has changed, for at least one of the regions:

when an upcoming switch point for the left-eye view is earlier than an upcoming switch point for the right eye view, switching to a different set of video data for the left-eye view before switching to a different set of video data for the right-eye view; and when the upcoming switch point for the right-eye view is earlier than the upcoming switch point for the left-eye view, switching to a different set of video data for the right-eye view before switching to a different set of video data for the left-eye view.

12. The method of claim 1, wherein the display comprises six faces, each of the faces being divided into four regions for a total of twenty-four regions.

13. The method of claim 12, wherein the first subset comprises four of the twenty-four regions, wherein the second subset comprises eight of the twenty-four regions, and wherein the third subset comprises eight of the twenty-four regions, the method further comprising retrieving video data having a fourth quality lower than the third quality for one or more remaining regions outside of the first subset, the second subset, and the third subset.

14. The method of claim 1, wherein the first quality comprises 6k resolution, wherein the second quality comprises 4k resolution, and wherein the third quality comprises 1080p resolution.

15. The method of claim 14, further comprising retrieving video data having 720p resolution for one or more remaining regions outside of the first subset, the second subset, and the third subset.

16. The method of claim 1, further comprising receiving metadata indicating, for each of the regions, available qualities of video data for the region, wherein the available qualities correspond to at least one of spatial resolution, quantization parameters (QPs), peak signal to noise ratio (PSNR), or bitrate.

17. The method of claim 1, further comprising receiving metadata indicating, for each of the regions, whether video data is available for only the region or whether video data is available for the region and one or more additional neighboring regions.

18. The method of claim 1, further comprising receiving metadata indicating, for each of the regions, positions of switch points within the video data for the region.

19. The method of claim 1, wherein retrieving the video data having the first quality for the first subset of the plurality of regions comprises:

when the visual focus of the user is directed to a center of a cube face of a cube map projection, retrieving a first mega-tile comprising video data for the cube face and portions of cube faces neighboring the cube face, wherein the first mega-tile has the first quality; and when the visual focus of the user is directed to a vertex of the cube map projection, wherein three of the cube faces form the vertex, retrieving a second mega-tile comprising video data for regions of each of the three of the cube faces forming the vertex, wherein the second mega-tile has the first quality.

20. A device for retrieving video data, the device comprising:

a display interface coupled to a display;
a memory configured to store video data; and
one or more processors configured to:
  determine a plurality of regions of video data to be displayed via the display, each of the plurality of regions having a plurality of qualities of video data available for retrieval;
  determine a first subset of the plurality of regions at which a visual focus of a user is directed;
  retrieve video data having a first quality of the plurality of qualities for the first subset of the plurality of regions at which the visual focus of the user is directed;
  retrieve video data having a second quality of the plurality of qualities for a second subset of the plurality of regions that neighbor the first subset of the plurality of regions, wherein the second quality is lower than the first quality; and
  retrieve video data having a third quality of the plurality of qualities for a third subset of the plurality of regions that is outside the first subset and the second subset, wherein the third quality is lower than the second quality.

21. The device of claim 20, wherein the one or more processors are configured to:

retrieve video data having a first spatial resolution for the first subset of the plurality of regions,
retrieve video data having a second spatial resolution that is lower than the first spatial resolution for the second subset of the plurality of regions, wherein the video data for the second subset of the plurality of regions is coded independently of the video data having the first spatial resolution, and
retrieve video data having a third spatial resolution that is lower than the second spatial resolution for the third subset of the plurality of regions, wherein the video data for the third subset of the plurality of regions is coded independently of the video data having the first spatial resolution and the video data having the second spatial resolution.

22. The device of claim 20, wherein the first subset of the plurality of regions comprises two or more regions, wherein video data is separately available for each of the two or more regions, and wherein the one or more processors are further configured to:

determine whether a single set of video data is available for each of the two or more regions; and when the single set of video data is available for each of the two or more regions, retrieve the single set of video data without retrieving the video data that is separately available for each of the two or more regions.

23. The device of claim 20, wherein the one or more processors are configured to retrieve a left-eye view and a right-eye view for each of the regions, wherein for at least one of the regions, the left-eye view includes switch points at a regular interval, the right-eye view includes switch points at the regular interval, and the switch points of the right-eye view have different playback tines than the switch points of the left-eye view.

24. The device of claim 23, wherein the one or more processors are further configured to, in response to determining that the focus of the user has changed, for at least one of the regions:
when an upcoming switch point for the left-eye view is earlier than an upcoming switch point for the right eye view, switch to a different set of video data for the left-eye view before switching to a different set of video data for the right-eye view; and
when the upcoming switch point for the right-eye view is earlier than the upcoming switch point for the left-eye view, switch to a different set of video data for the right-eye view before switching to a different set of video data for the left-eye view.

25. The device of claim 20, wherein the device comprises at least one of:
an integrated circuit;
a microprocessor; or
a wireless communication device.

26. A device for retrieving video data, the device comprising:
means for determining a plurality of regions of video data to be displayed via a display, each of the plurality of regions having a plurality of qualities of video data available for retrieval;
means for determining a first subset of the plurality of regions at which a visual focus of a user is directed;
means for retrieving video data having a first quality of the plurality of qualities for the first subset of the plurality of regions at which the visual focus of the user is directed;
means for retrieving video data having a second quality of the plurality of qualities for a second subset of the plurality of regions that neighbor the first subset of the plurality of regions, wherein the second quality is lower than the first quality; and
means for retrieving video data having a third quality of the plurality of qualities for a third subset of the plurality of regions that is outside the first subset and the second subset, wherein the third quality is lower than the second quality.

27. A non-transitory computer-readable storage medium having stored thereon instructions that, when executed, cause a processor to:
determine a plurality of regions of video data to be displayed via a display, each of the plurality of regions having a plurality of qualities of video data available for retrieval;\
determine a first subset of the plurality of regions at which a visual focus of a user is directed;
retrieve video data having a first quality of the plurality of qualities for the first subset of the plurality of regions at which the visual focus of the user is directed;
retrieve video data having a second quality of the plurality of qualities for a second subset of the plurality of regions that neighbor the first subset of the plurality of regions, wherein the second quality is lower than the first quality; and
retrieve video data having a third quality of the plurality of qualities for a third subset of the plurality of regions that is outside the first subset and the second subset, wherein the third quality is lower than the second quality.

28. The non-transitory computer-readable storage medium of claim 27,
wherein the instructions that cause the processor to retrieve the video data having the first quality comprise instructions that cause the processor to retrieve video data having a first spatial resolution for the first subset of the plurality of regions;
wherein the instructions that cause the processor to retrieve the video data having the second quality comprise instructions that cause the processor to retrieve video data having a second spatial resolution that is lower than the first spatial resolution for the second subset of the plurality of regions, wherein the video data for the second subset of the plurality of regions is coded independently of the video data having the first spatial resolution; and
wherein the instructions that cause the processor to retrieve the video data comprise instructions that cause the processor to retrieve video data having a third spatial resolution that is lower than the second spatial resolution for the third subset of the plurality of regions, wherein the video data for the third subset of the plurality of regions is coded independently of the video data having the first spatial resolution and the video data having the second spatial resolution.

29. The non-transitory computer-readable storage medium of claim 27, further comprising instructions that cause the processor to retrieve a left-eye view and a right-eye view for each of the regions, wherein for at least one of the regions, the left-eye view includes switch points at a regular interval, the right-eye view includes switch points at the regular interval, and the switch points of the right-eye view have different playback times than the switch points of the left-eye view.

30. The non-transitory computer-readable storage medium of claim 29, further comprising instructions that cause the processor to, in response to determining that the focus of the user has changed, for at least one of the regions:
when an upcoming switch point for the left-eye view is earlier than an upcoming switch point for the right eye view, switch to a different set of video data for the left-eye view before switching to a different set of video data for the right-eye view; and
when the upcoming switch point for the right-eye view is earlier than the upcoming switch point for the left-eye view, switch to a different set of video data for the right-eye view before switching to a different set of video data for the left-eye view.

* * * * *